(12) United States Patent
Legrand et al.

(10) Patent No.: US 7,388,368 B2
(45) Date of Patent: Jun. 17, 2008

(54) ENCODER FOR A POSITION SENSOR WITH A STABILIZING EFFECT FOR THE PASSING THROUGH ZERO OF THE MAGNETIC INDUCTION

(75) Inventors: Bertrand Legrand, Grenoble (FR); Jérôme Corona, Vilette d'Anthon (FR)

(73) Assignee: Electricfil Automotive, Miribel (FR)

( * ) Notice: Subject to any disclaimer, the term of this patent is extended or adjusted under 35 U.S.C. 154(b) by 0 days.

(21) Appl. No.: 11/798,350

(22) Filed: May 14, 2007

(65) Prior Publication Data
US 2008/0018330 A1 Jan. 24, 2008

(30) Foreign Application Priority Data
May 15, 2006 (FR) .................................. 06 51731

(51) Int. Cl.
*G01B 7/30* (2006.01)
(52) U.S. Cl. .................. 324/207.25; 324/174
(58) Field of Classification Search ........ 324/173–174, 324/207.25; 73/514.16, 514.31, 514.39; 338/32 R, 32 H
See application file for complete search history.

(56) References Cited

U.S. PATENT DOCUMENTS 4,695,795 A * 9/1987 Nakamizo et al. ..... 324/207.15
4,866,381 A * 9/1989 Tatsuhiko .............. 324/207.25

\* cited by examiner

*Primary Examiner*—Bot LeDynh
(74) *Attorney, Agent, or Firm*—Clark & Brody

(57) ABSTRACT

The object of the invention relates to an encoder for a position sensor, including at least one junction (J) between one so-called small pole (P) and one so-called large pole (G), having an angular width larger than the angular width of the small pole, the small pole (P) and the large pole (G) corresponding to each junction (J) having polarities of opposite signs, characterized in that, for each junction (J), the large pole (G) of a given sign consists: of at least one small stabilizing pole (ps) of the same sign placed adjacent to the small pole (P) of opposite sign and having an angular width substantially identical with that of said first pole, one the one hand and of at least one complementary pole (pc) of the same sign as the stabilizing pole (ps), the complementary pole (pc) and/or the small stabilizing pole (ps) having a gradual magnetization profile adapted for stabilizing the passing through zero gauss of the radial component of the magnetic induction, on the other hand.

20 Claims, 3 Drawing Sheets

… …

ENCODER FOR A POSITION SENSOR WITH A STABILIZING EFFECT FOR THE PASSING THROUGH ZERO OF THE MAGNETIC INDUCTION

This application claims foreign priority based on French Patent Application No. 06 51 731, filed May 15, 2006, the content of which is incorporated herein by reference in its entirety.

The present invention relates to the technical field of magnetic sensors including an encoder component moving near a detector cell and suitable for detecting the position and/or the velocity of a mobile target in the broadest sense.

The object of the invention more particularly relates to making an encoder equipped with a series of alternately mounted North and South poles.

The object of the invention finds a particularly advantageous application in the automotive field where such a sensor may be used, for example within the framework of ignition and injection functions.

The object of the invention is more specifically directed to the field of magnetic sensors of the TPOS (true power on sensor) type capable of providing as soon as a voltage is applied to them, a piece of information corresponding to the position of the mobile target.

In the state of the art, different types of sensors are known capable of providing as soon as voltage is applied to them, a piece of information corresponding to the position of the mobile target. Such a sensor includes a mobile target for example made in a soft magnetic material and having at least one, and generally, a series of teeth separated by recesses. Such a sensor also includes a magnetized permanent magnet defining a gap with the mobile target. A probe is positioned in the gap and is sensitive to the direction and intensity of magnetic induction.

The displacement of the mobile target causes for each tooth moving past the probe, a change in the magnetic induction crossing the probe which thereby delivers an electric signal according to the direction and the amplitude of the magnetic induction. This sensitive probe is notably associated with a hysteresis level comparator, the output of which assumes a first logic state when the electric signal delivered by the probe is larger than a predetermined threshold and a second logic state when the electric signal is less than a predetermined threshold.

This type of sensor provides a signal corresponding to a recess or to a tooth as soon as a voltage is applied to the sensor without motion of the target. The drawback of such a sensor is its sensitivity to variation of parameters such as temperature and the gap between the target and the sensor.

In the state of the art, a position or velocity sensor including a magnetic encoder moving past a detector cell is also known for example from EP 0 611 952 and FR 2 757 943. Such an encoder is formed by a multipolar magnetic ring provided on its circumference with alternating North and South poles, at least one pole of which is said to be irregular because it has a different angular width from the pitch separating the other poles. The drawback of such a sensor is its high sensitivity to the variation of the gap between the measuring cell and the encoder. Indeed, the polarity of the magnetic induction measured by a cell is the image of that of the magnetic pole in front of which it is found. However, the position of the transition between one polarity and the next polarity is aligned on the transition between two magnetic poles only if these poles are of identical width and magnetization or if the gap between the cell and the magnetic encoder is minimal. FIG. 6 shows the positions of the transitions of the magnetic induction measured between two consecutive opposite poles of a multipolar encoder. The shift in the position of the boundary or of the transition t between a large pole G and a small pole P of opposite polarity may be illustrated in this FIG. 6. More a large pole has a large angular width with respect to the small neighboring poles, more this large pole tends to widen the area in which the cell measures an induction, the polarity of which is the one which matches it. It seems that the tendency is all the more marked as the gap between the cell and encoder is large.

The object of the invention is therefore directed to finding a remedy to these drawbacks of the state of the art by proposing an encoder for a position and/or velocity sensor, which is not very sensitive to the gap variation while being capable of providing a useful signal as soon as voltage is applied to it.

To achieve such a goal, the object of the invention is directed to an encoder for a position sensor of the type including a multipolar magnetic ring provided on its circumference, with alternately positioned poles having polarities of opposite signs, and intended to move past a measuring cell delivering a periodic signal corresponding to the change in intensity of the radial component of the magnetic induction delivered by the poles, the encoder including at least one junction between one so-called small pole and one so-called large pole having an angular width larger than the angular width of the small pole, the small pole and the large pole corresponding to each junction having polarities of opposite signs.

According to the invention, for each junction, the large pole of a given sign consists:

of at least one small stabilizing pole of the same sign adjacent to the small pole of opposite sign and having an angular width substantially identical with that of said small pole on the one hand, and, of at least one complementary pole of the same sign as the stabilizing small pole, the complementary pole and/or the small stabilizing pole having a profile of gradual magnetization adapted for stabilizing the passing through zero gauss of the radial component of the magnetic induction, on the other hand.

According to an advantageous embodiment feature, for each junction, the small stabilizing pole has a magnetization profile, substantially identical but with an opposite sign, with the profile of the magnetization of the small pole.

According to another advantageous embodiment feature, both contiguously placed complementary poles have substantially identical magnetization profiles with opposite signs.

According to an alternative embodiment, the complementary pole and/or the small stabilizing pole have a magnetization profile with non-magnetic portions.

According to another alternative embodiment, the complementary pole and/or the small stabilizing pole have an evolvable shape.

According to another alternative embodiment, the complementary pole and/or the small stabilizing pole have a magnetization profile with successive areas of constant values and of opposite signs.

Another object of the invention aims at proposing a position sensor including an encoder according to the invention moving past a measuring cell delivering a periodic electric signal corresponding to the change in intensity of the radial component of the induction generated by the poles.

According to a preferred application, the encoder is blocked in rotation on a shaft of an engine of a motor vehicle.

According to a preferred alternative embodiment, the encoder is blocked in rotation on the camshaft of an engine of a motor vehicle.

Other various features will become apparent from the description made below with reference to the appended drawings which show, as non-limiting examples, embodiments of the object of the invention.

Figure 1:
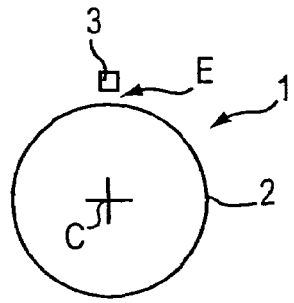
FIG. 1 is a schematic view showing a position sensor according to the invention.

As this is more specifically apparent from FIG. 1, the object of the invention relates to a position and/or velocity sensor 1 including a magnetic encoder 2 intended to move past a detector or measuring cell 3. The encoder 2 is formed as a multipolar magnetic ring driven into rotation around its centre c and provided on its circumference with magnetic poles with polarities of opposite signs, while being positioned alternately. The encoder 2 thus includes alternately mounted North poles N and South poles S, having radial magnetization.

Figure 2A:
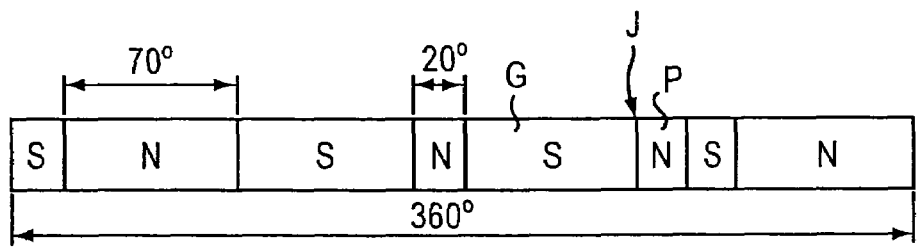
FIG. 2A is a view reduced to a planar view of an exemplary embodiment of the encoder from the prior art.

The encoder 2 includes at least one, and in the example illustrated in FIG. 2A, four so-called small poles P and four so-called large poles G each having an angular width larger than the angular width of a small pole P. For example each large pole G has an angular width equal to 70°, whereas each small pole P has an angular width equal to 20°. In the illustrated example, the encoder 2 has two large South poles G and two large North poles G as well as two small South poles P and two small North poles P. The North and South poles are positioned so as to obtain alternating polarities along the periphery of the encoder.

Figure 2B:
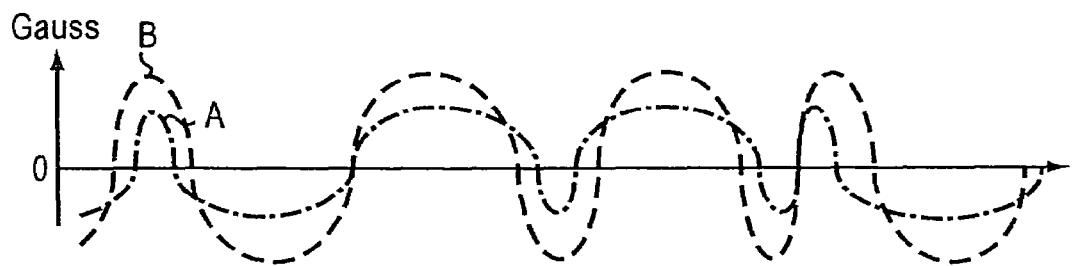
FIG. 2B illustrates the change in the radial component of the magnetic induction as measured for two different gaps, with the encoder illustrated in FIG. 2A.
Figure 2C:
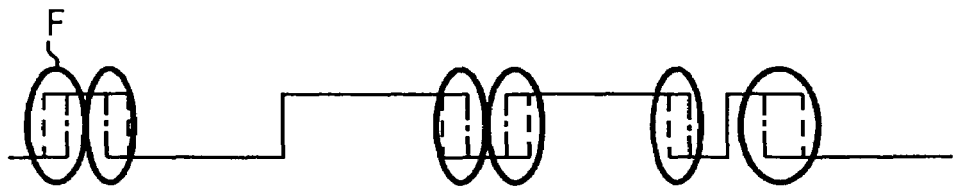
FIG. 2C illustrates the transitions of the output voltage of a sensor for values of the detected magnetic induction, for the encoder illustrated in FIG. 2A.

In the example illustrated in FIG. 2A, six junctions J thus appear between a large pole G and a small pole P which have polarities opposite to each other. It is found, thus as illustrated in FIG. 2B, that at each passage of such a junction J between a small pole P and a large pole G, the passing through zero gauss of the radial component of the magnetic induction is shifted according to the gap variation E between the encoder 2 and the measuring cell 3. Curves A and B illustrate the change in the radial component of the measured magnetic induction when the encoder illustrated in FIG. 2A moves past the cell 3, for two different values of the gap E. The result is an instability at the leading edges F of the signal delivered at the output of a level comparator taking into account the signal from the measuring cell 3 (FIG. 2C). It should be noted that at a junction between two poles of a same category, (both large North and South poles G or both small North and South poles P) the passing through zero gauss of the radial component of the magnetic induction is substantially the same for different values of the gap E. Therefore, no instability occurs at the corresponding leading edges of the signal from the measuring cell (FIG. 2C).

The object of the invention therefore aims at finding a remedy to this drawback by avoiding a shift in the positions of the transitions, depending on the gap variation E. As this more specifically appears in FIG. 3A, the encoder 2 according to the invention, includes for each junction between a large pole G and a small pole P, a large pole G consisting:

of at least one stabilizing small pole ps of the same sign as the large pole G and adjacent to the small pole P of opposite sign of said junction, the small stabilizing pole ps having an angular width substantially identical with that of the small pole P, on the one hand, and of at least one complementary pole pc of the same sign as the small stabilizing pole ps, the complementary pole pc and the small stabilizing pole ps having a gradual magnetization profile adapted for stabilizing the passing through zero gauss of the radial component of the magnetic induction, on the other hand.

Thus, for a junction for example J, between a small North pole P and a large South pole G, the large South pole G consists of a small stabilizing South pole ps placed adjacent to the small North pole, on the one hand. The angular width of the small stabilizing South pole ps is substantially identical with the angular width of the small North pole P. Moreover, the large South pole G also includes a complementary South pole pc. The complementary South pole pc and the small stabilizing South pole ps have a gradual magnetization profile adapted for stabilizing the passing through zero gauss of the radial component of the magnetic induction.

It should be considered that this multipolar magnetic ring or magnet 2 is made in a material which may assume variable magnetization values, as a result of applying a magnetizing field, between two extreme values ±Br (corresponding to the remanent induction of the material). Depending on the magnetizing field applied to this ring or ring portion, it is possible to obtain variable or gradual magnetization profiles along which the magnetization value gradually varies from a minimum value to a maximum value. The magnetization profile may be continuously variable between the extreme values of the remanent induction, or include planar areas each corresponding to a constant magnetization value but different from each other and assuming any value between the extreme values of the remanent induction.

Figure 3A:
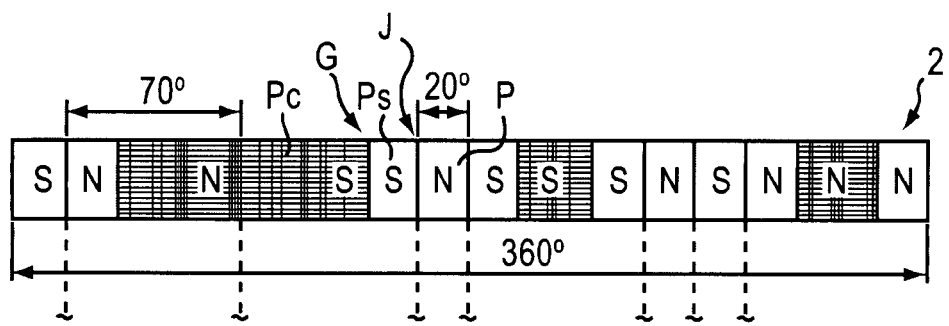
FIG. 3A is a view reduced to a planar view of an exemplary embodiment of an encoder according to the invention.
Figure 3B:
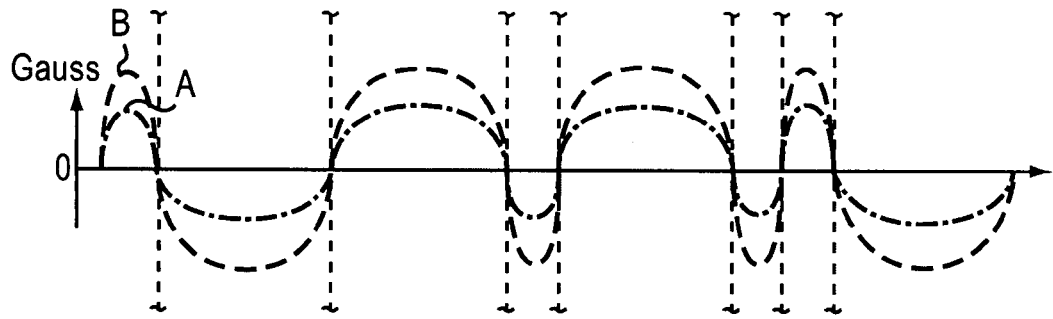
FIG. 3B illustrates the change in the radial component of the magnetic induction as measured for two different gaps, with the encoder illustrated in FIG. 3A.

Thus in the example illustrated in FIG. 3A, the curves A and B of FIG. 3B show the effect of a particular magnetization profile by giving the magnetic induction in air close to the magnetic ring 2 for two different gap values.

Figure 3C:
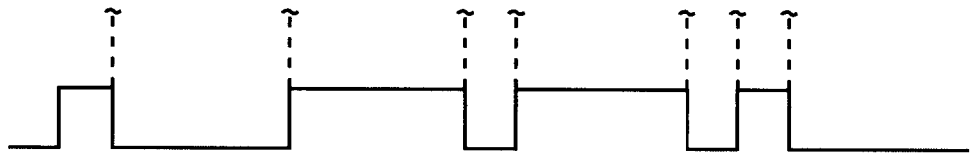
FIG. 3C illustrates the transitions of the output voltage of a sensor for values of the detected magnetic induction, for the encoder illustrated in FIG. 3A.
Figure 6:
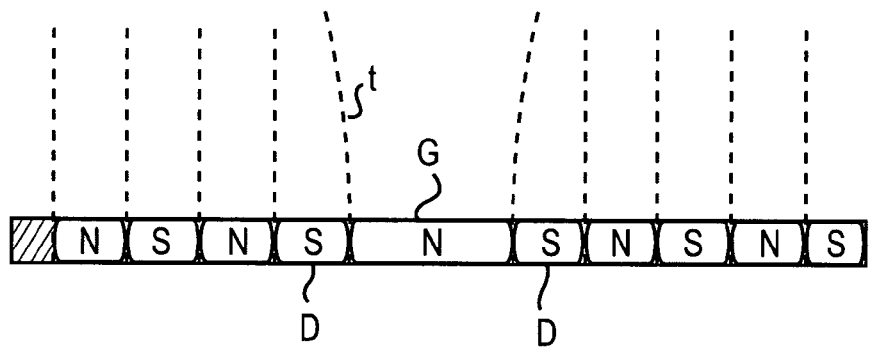
FIG. 6 is a view reduced to a planar view, showing the positions of the transitions of the magnetic induction as measured between two consecutive poles of opposite signs of a multipolar encoder from the prior art.

Thus, as this is apparent from FIG. 3B, the magnetization of the large pole G, i.e., of the complementary pole pc and of the small stabilizing pole ps, is such that at the junction between this large pole G and the small adjacent pole P, the passing through zero gauss of the radial component of the magnetic induction is the same for the different values A, B of the gap E. No instability occurs at the corresponding leading edges of the signal from the measuring cell (FIG. 3C).

It should be noted that two complementary poles pc with opposite signs placed adjacent to each other, advantageously have substantially identical magnetization profiles with opposite signs so as to retain at their junction, the stability for the leading edge F of the signal from the measuring cell.

Of course, the object of the invention may be applied for a junction J between a large North pole G and a small South pole P. In this case, the large North pole G consists of a small stabilizing North pole ps placed adjacent to the small South pole P of the one hand, and of a complementary North pole pc on the other hand.

According to an advantageous feature of the object of the invention, for each junction J, the small stabilizing pole ps has a magnetization profile substantially identical but of opposite sign, with the profile of the magnetization of the small pole P. More specifically, because of the presence of the complementary pole pc, the position of the transition of the magnetic induction, between the small stabilizing pole ps and the small pole P, tends to be shifted towards the small pole P. The magnetization profile of the small stabilizing pole ps is therefore adapted in order to take into account the influence of the complementary pole pc. Thus, the magnetization profile of the small stabilizing pole ps has a value or level slightly less than the value or level of the magnetization profile of the small pole P. To do this, the angular width of the small stabilizing pole ps is slightly smaller than the width of the small pole P or the magnetization level of the small stabilizing pole is less than the magnetization level of the small pole P.

Figure 4A:
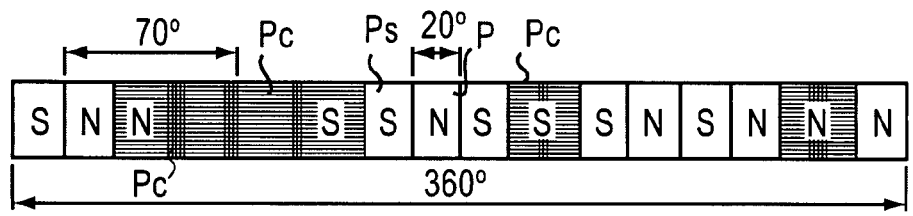
FIG. 4A is a view reduced to a planar view of an exemplary embodiment of an encoder according to the invention.
Figure 4B:
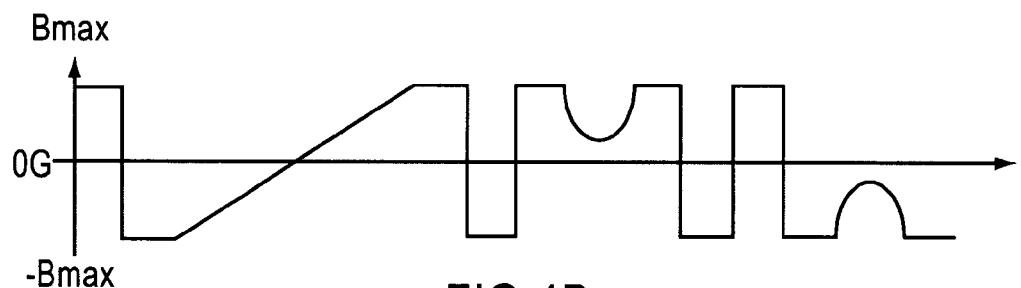
FIG. 4B illustrates an example of a gradual magnetization profile for the poles of an encoder illustrated in FIG. 4A.

It is apparent from the preceding description that the complementary pole pc and/or the small stabilizing pole ps have a gradual magnetization, i.e. magnetization, the value of which is not constant. FIGS. 4A and 4B illustrate as an example, different gradual magnetization profiles for the complementary poles pc. Thus, a magnetization which varies linearly or which varies according to a parabolic type profile may for example be provided for these poles.

Figure 5A:
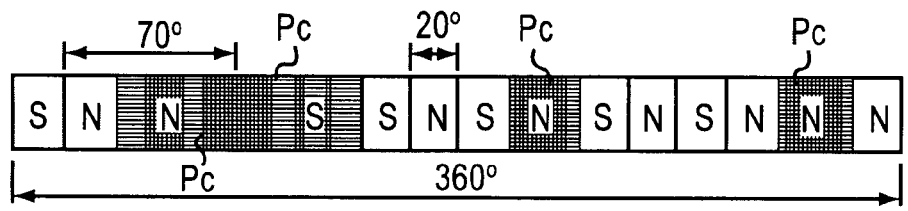
FIG. 5A is a view reduced to a planar view of an exemplary embodiment of an encoder according to the invention.
Figure 5B:
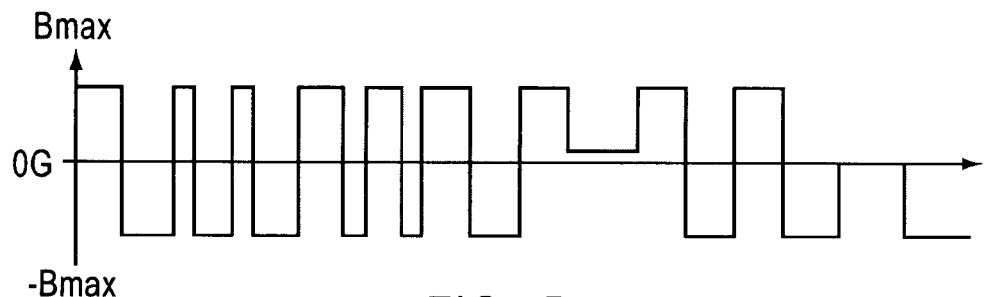
FIG. 5B illustrates another exemplary embodiment of a magnetization profile of the poles of an encoder according to the invention illustrated in FIG. 5A.

According to another alternative embodiment, the complementary pole pc and/or the small stabilizing pole ps have a magnetization profile with non-magnetic portions and/or successive areas with constant values and of opposite signs. In the example illustrated in FIGS. 5A and 5B, one of the complementary poles pc has a magnetization value equal to zero gauss. According to this example, one of the complementary poles has a magnetization value intermediate between the zero value and the maximum magnetization value whereas another complementary pole pc is formed by successive magnetized areas of opposite signs.

According to another embodiment, the complementary pole pc and/or the small stabilizing pole ps, have an evolvable shape. In this respect, the section of the complementary pole pc or of the small stabilizing pole ps, may be different from a rectangle as illustrated and for example has a different polygonal shape such as a hexagon.

The encoder 2 according to the invention as described above is intended to be fixedly mounted in rotation, advantageously on a shaft of an engine of a motor vehicle. Preferably, the encoder 2 is blocked in rotation on the camshaft of an engine of a motor vehicle.

The invention is not limited to the described and illustrated examples because various changes may be made thereto without departing from its scope.

The invention claimed is:

1. An encoder for a position sensor, of the type including a multipolar magnetic ring (2) provided, on its circumference, with alternately positioned poles having polarities of opposite signs and intended to move past a measuring cell (3) delivering a periodic signal corresponding to the change in the intensity of the radial component of the magnetic induction delivered by the poles, the encoder including at least one junction (J) between one so-called small pole (P) and one so-called large pole (G), having an angular width larger than the angular width of the small pole, the small pole (P) and the large pole (G) corresponding to each junction (J) having polarities of opposite signs, characterized in that, for each junction (J), the large pole (G) of a given sign consists:

of at least one small stabilizing pole (ps) of the same sign placed adjacent to the small pole (P) of opposite sign and having an angular width substantially identical to that of said small pole on the one hand, and of at least one complementary pole (pc) of the same sign as the stabilizing pole (ps), the complementary pole (pc) and/or the small stabilizing pole (ps) having a gradual magnetization profile adapted for stabilizing the passing through zero gauss of the radial component of the magnetic induction, on the other hand.

2. The encoder for a position sensor according to claim 1, characterized in that for each junction (J), the same stabilizing pole (ps) has a magnetization profile substantially identical but of opposite sign, with the profile of the magnetization of the small pole (P).

3. The encoder for a position sensor according to claim 1, characterized in that two complementary poles (pc) placed contiguously have substantially identical magnetization profiles with opposite signs.

4. The encoder for a position sensor according to claim 1, characterized in that the complementary pole (pc) and/or the small stabilizing pole (ps) have a magnetization profile with non-magnetic portions.

5. The encoder for a position sensor according to claim 1, characterized in that the complementary pole (pc) and/or the small stabilizing pole (ps) have an evolvable shape.

6. The encoder for a position sensor according to claim 1, characterized in that the complementary pole (pc) and/or the small stabilizing pole (ps) have a magnetization profile with successive areas of constant values and of opposite signs.

7. A position sensor characterized in that it includes at least one encoder (2) according to claim 1, moving past a measuring cell (3) delivering a periodic electric signal corresponding to the change in the intensity of the radial component of the magnetic induction generated by the poles.

8. The position sensor according to claim 7, characterized in that the encoder (2) is blocked in rotation on a shaft of an engine of a motor vehicle.

9. The position sensor according to claim 8, characterized in that the encoder (2) is blocked in rotation on the camshaft of an engine of a motor vehicle.

10. The encoder for a position sensor according to claim 2, characterized in that the complementary pole (pc) and/or the small stabilizing pole (ps) have a magnetization profile with non-magnetic portions.

11. The encoder for a position sensor according to claim 3, characterized in that the complementary pole (pc) and/or the small stabilizing pole (ps) have a magnetization profile with non-magnetic portions.

12. The encoder for a position sensor according to claim 2, characterized in that the complementary pole (pc) and/or the small stabilizing pole (ps) have an evolvable shape.

13. The encoder for a position sensor according to claim 3, characterized in that the complementary pole (pc) and/or the small stabilizing pole (ps) have an evolvable shape.

14. The encoder for a position sensor according to claim 2, characterized in that the complementary pole (pc) and/or the small stabilizing pole (ps) have a magnetization profile with successive areas of constant values and of opposite signs.

15. The encoder for a position sensor according to claim 3, characterized in that the complementary pole (pc) and/or the small stabilizing pole (ps) have a magnetization profile with successive areas of constant values and of opposite signs.

16. A position sensor characterized in that it includes at least one encoder (2) according to claim 2, moving past a measuring cell (3) delivering a periodic electric signal corresponding to the change in the intensity of the radial component of the magnetic induction generated by the poles.

17. A position sensor characterized in that it includes at least one encoder (2) according to claim 3, moving past a measuring cell (3) delivering a periodic electric signal corresponding to the change in the intensity of the radial component of the magnetic induction generated by the poles.

18. A position sensor characterized in that it includes at least one encoder (2) according to claim 4, moving past a measuring cell (3) delivering a periodic electric signal corresponding to the change in the intensity of the radial component of the magnetic induction generated by the poles.

19. A position sensor characterized in that it includes at least one encoder (2) according to claim 5, moving past a measuring cell (3) delivering a periodic electric signal corresponding to the change in the intensity of the radial component of the magnetic induction generated by the poles.

20. A position sensor characterized in that it includes at least one encoder (2) according to claim 6, moving past a measuring cell (3) delivering a periodic electric signal corresponding to the change in the intensity of the radial component of the magnetic induction generated by the poles.

* * * * *